Nov. 20, 1956  W. GEHRIG  2,770,910
COMBINED FISHING WEIGHTS AND ASSEMBLY BODIES
Filed Nov. 30, 1953

INVENTOR.
Walter Gehrig

United States Patent Office 2,770,910
Patented Nov. 20, 1956

2,770,910

COMBINED FISHING WEIGHTS AND ASSEMBLY BODIES

Walter Gehrig, Flint, Mich.

Application November 30, 1953, Serial No. 395,105

9 Claims. (Cl. 43—44.9)

The present invention relates to casting weights, sinkers and bobbers used for fishing. It consists substantially of a body forming an assembly-member for neat and convenient assembly with a fishing line and with a flexible hookleader such as a snell. The body has adequate specific gravity to serve as a casting weight for casting small light lures with a casting rod and reel.

A casting weight made of glass besides being transparent also has just about the right specific gravity to cast well with a leader and lure thereon. In the water such a glass sinker travels at a good depth below the surface when retrieved slowly. But it is impractical and/or expensive to produce small glass sinkers with small and deep holes therethrough. The hereafter described structure makes economical mass production of glass sinkers possible. In the illustrated form the line and leader is attached to an interposed body member of transparent plastic or other suitable material which has thicker outside members of glass secured thereto. A slot in the interposed member provides a leader passageway across and through the assembled body. A protruding portion of the interposed member provides a line and leader attaching means. The features of this construction can also be incorporated in bobbers made mostly of cork, balsawood, foam plastic, etc. Fishing lines and leaders tied directly to the soft materials named above have a tendency to cut through the soft material or to tear off a piece therefrom.

One object of the present invention is to provide a means which makes it possible to mass-produce glass sinkers at a reasonable cost.

Another object of the invention is to provide a combined casting weight, sinker or bobber, and assembly member having simple and convenient means for neat assemblage with a leader and a fishing line.

Another object of the invention is to provide means on an assembly member whereby leader tension is transmitted directly to the fishing line.

A further object of the present invention is to enclose the looped end of a hookleader and the protruding stubby leader end within the assembly member to prevent entanglement thereof with other objects.

Another object of the invention is to facilitate the manufacture of a narrow but comparatively wide leader passageway through the body, which makes passage of a leaderloop easy.

Another object of the invention is to provide a bobber which has a relatively hard reinforcing member adapted to have the hookleader and the fishing line secured thereto.

Different forms and sizes of the described casting weight, sinker or bobber, and assembly member can be manufactured for the various fishing conditions and different fishing methods without departing from the scope of the invention. In the illustrated form the body generally has the shape of a ball or bubble, but the interposed member may be inserted between outside members wherein one is parallel or flat. The outline of said members may be generally circular, triangular or rectangular without departing from the inventive idea. Furthermore one outside member may be omitted and the shallow but wide passageway could open through only one joint-face of the plastic body member.

With these and other objects in view, the invention consists in features of construction, combination and arrangements of parts as will be hereinafter more fully described in detail, illustrated in the accompanying drawing which discloses the preferred embodiments of the invention and pointed out in the claims hereunto appended.

Figure 1 of the drawing is a view of the normal trailing end of the fishing weight and assembly member.

The illustrated and hereafter described body is made of clear transparent plastic and of clear glass, but it is understood that any other suitable material may be substituted without departing from the scope of the invention.

Figure 4:
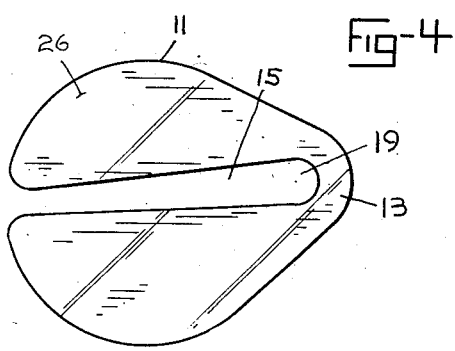
Figure 4 is a plane view of a separate interposed member.

In the drawing the numeral 11 indicates an interposed body-member of flat and transparent plastic material, such as "Plexiglas" or cellulose acetate. The outline of the comparatively thin interposed member generally matches the outline of the outside members 12 of glass except at the leading end thereof where a portion 13 of the interposed member protrudes from between the outside portions 12. In the illustrated form the outside members 12 have a solid semispherical shape. The generally flat inside joint-faces 14 of the outside members 12 are rigidly and permanently secured to opposite joint-faces 26 of the interposed member 11 by means of an adhesive substance, such as transparent plastic cement. The inside faces 14 of the semi-spherical members may not be exactly flat due to distortion and shrinkage after molding. During the assembling operation the members may be heated to a temperature which causes the plastic center portion 11 to soften to such a degree so that it will conform to minor deformation of the generally flat faces of the outside members 12 when interposed therebetween under pressure. The three body members thus form a single unit. The assembly member has a leader passageway 15 arranged between the inside faces 14 of the outside members 12. Said leader passageway may be provided in the form of a comparatively shallow and wide groove or slot extending through the body 16 and opening through one or both joint-faces 26 of the interposed body-member. In the illustrated form, the passageway is provided by a slot 15 in the interposed member, as shown in Figure 4 of the drawing.

Figure 1:
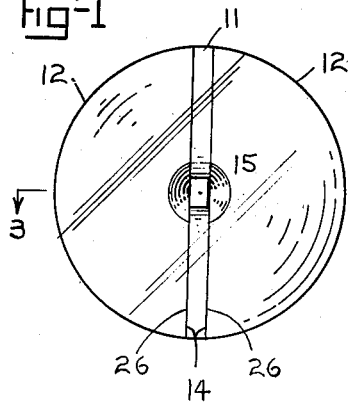
Figure 2:
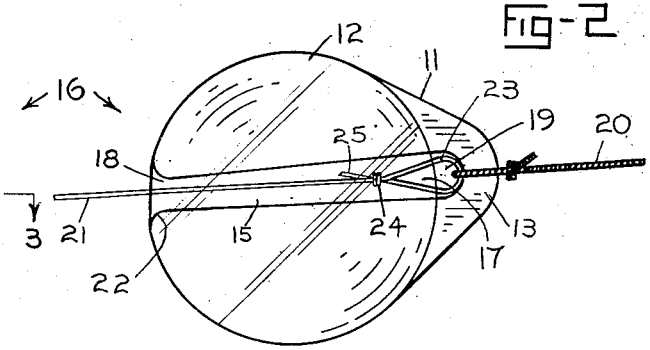
Figure 2 is a side view of the same fishing weight.
Figure 3:
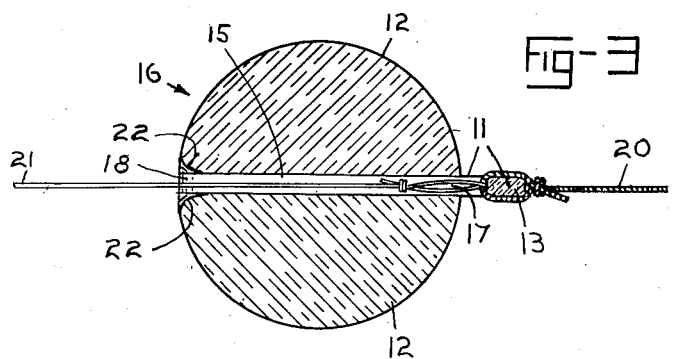
Figure 3 is a longitudinal mid-section through the fishing weight, transverse to the interposed member.
Figure 5:
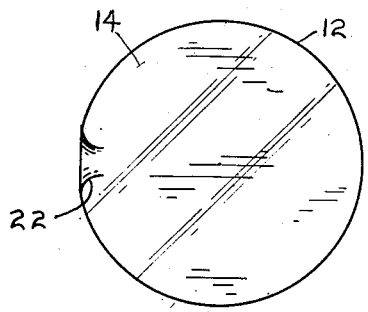
Figure 5 is a plane view of the inside face of a separate outside member.

The adjacent joint-faces 14 of the outside members cover and close the open slot sides of the passageway. One end of the passageway-cavity 15 opens from between the outside members where the interposed member protrudes therefrom. The end of the slot extends a short distance beyond the inside faces of the outside members and thus forms an exposed aperture 19 through the protruding leading portion 13 of the interposed member, as shown in Figure 2 of the drawing. This aperture provides a line and leader attaching means for the connective ends of the fishing line 20 and hookleader 21. It is understood that a small separate line-aperture for the fishing line may be provided in the protruding portion of the interposed member, near the point where the passageway opens from between the outside members, without departing from the inventive idea. The protruding portion of the interposed member forms a ribbon 13 about the leading end of the passageway-slot 15 and is adapted to have the fishing line 20 tied thereto, as illustrated. The passageway-slot extends diagonally across the body 16 and the other and trailing end 18 thereof also opens through the body-surface from between the outside members at a point about opposite from the leading end 17 of the passageway. The trailing end 18 of the passageway-cavity and the adjacent body-surface 22 is flared to blend into the matched outer surface of the fishing weight. A portion of the flared end 22 of the passageway is formed by the inside face of each outside member, as shown in Figure 5. The described passageway is adapted to receive and circum-restrict the connective end portion of a flexible hookleader 21, such as a snell, which has a fish-hook and a fish-lure (not shown) secured to the trailing end thereof. The hookleader 21 is assembled with the fishing weight 16 by passing the connective end thereof through the passageway and body from the flared end toward the normal leading end of the body. The connective end of the hookleader can be tied directly and independently to the protruding ribbon 13 of the interposed member. A more convenient way is to tie a loop 23 with the leading end of the leader and then pass the same through the passageway to the end 19 of the slot in the intermediate member and pass the end of the fishing line through the loop and aperture and tie the line to the leading end of the assembly member as shown in Figures 2 and 3. The line knot thus secures both the leader and line to the fishing weight. Furthermore the leader-loop 23, the leaderknot 24 and the stubby end 25 of the leader are neatly enclosed in the passageway, which in turn eliminates entanglement of weeds, fishhooks, etc., thereon. During casting, the comparatively long remainder of the hookleader 21 can swing about the flared bending form 22 provided by that end of the body where the retained hookleader emerges therefrom.

If the above described interposed member has floating outside members of foam plastic or other soft material secured thereto, then the comparatively hard interposed member acts also as a reinforcement.

While I have described my invention in detail in the present preferred embodiments, it will be obvious to those skilled in the art that various changes and modifications may be made therein without departing from the spirit or scope thereof. I aim in the appended claims to cover such modifications and changes to the best of my ability.

What I claim is:

1. A combined fishing weight and assembly member for a fishing line and a flexible hookleader, comprising a body assembled of outside members and an interposed member to form a single unit, the interposed member consisting of a piece of generally flat and comparatively thin material, each outside member having a generally flat joint-face which is secured to a respective side and joint-face of the interposed member, a portion of the interposed member protruding from between the outside members and constituting the normal leading end of the assembled body, said interposed member having a comparatively long narrow leader passageway-slot formed therein with the slot-sides opening through both joint-faces of the interposed member and the outside members covering and closing the slot-sides, one end of the passageway-slot opening from between the outside members and forming an exposed line aperture beyond the outside members through said protruding portion of the interposed member to secure the end of a fishing line to the remaining leading end portion of the interposed member, the other end of the passageway-slot opening from between the trailing portions of the outside members and being flared to blend into the adjacent matched outer surface of the body-members, the body and surface forming said leader passageway being adapted to receive and circum-restrict the connective end-portion of a hookleader, and a leader retaining means being associated with said protruding portion of the interposed member to secure the connective end of the hookleader in the passageway thereto with the remainder of the hookleader protruding from the flared end of the passageway.

2. A combined fishing weight and assembly member for a fishing line and a flexible hookleader, comprising a body assembled of outside members and an interposed member to form a single unit, the interposed member consisting of a piece of generally flat and comparatively thin material, each outside member having a generally flat joint-face which is secured to a respective side and joint-face of the interposed member, a portion of the interposed member protruding from between the outside members and constituting the normal leading end of the assembled body, an exposed line aperture being formed in said protruding portion of the interposed member to secure the end of a fishing line thereto, said interposed member having a comparatively long narrow leader passageway-slot formed therein which extends between and along the full length of the adjacent joint-faces of the outside members, said passageway-slot opening through at least one joint-face of the interposed member for at least that distance which is covered by the adjacent outside member, one end of the passageway-slot opening from between the outside members through the outside surface of the assembled body at the leading end thereof, the other end of the passageways opening from between the trailing portions of the outside members and being flared to blend into the adjacent matched outer surface of the body-members, the body-surface forming said leader passageway being adapted to receive and circum-restrict the connective end portion of a hookleader, and a leader retaining means being associated with said protruding portion of the interposed member to secure the connective end of the hookleader in the passageway thereto with the remainder of the hookleader protruding from the flared end of the passageway.

3. A combined fishing weight and assembly member for a fishing line and a flexible hookleader comprising a body assembled of outside members and an interposed member to form a single unit, the interposed member consisting of a piece of generally flat comparatively thin material, each outside member having a generally flat joint-face which is secured to a respective side and joint-face of the interposed member, a line attaching means for the end of a fishing line being provided at the normal leading end of the assembled body, the latter having a leader passageway arranged therethrough between the joint-faces of the outside members, one end of the passageway opening from between the outside members through the outside surface of the assembled body at the normal leading end thereof, the other end of the passageway opening from between the body members at the trailing end of the body and being flared to blend into the adjacent matched outer surface of the body-members, the body-surface forming said passageway being adapted to receive and circum-restrict the connective end-portion of a hookleader, and a leader retaining means associated with the leading end of the body being adapted to have the connective end of the hookleader in the passageway secured thereto with the remainder of the hookleader protruding from the flared end of the passageway.

4. A combined fishing weight and assembly member for a fishing line and a flexible hookleader, comprising a body assembled of a plurality of body-members to form a single unit, each member having a generally matching joint-face which is secured to the joint-face of the adjacent member, one of said body-members protruding from the adjacent member at the normal leading end of the body and having a line aperture through the protruding portion to secure the end of a fishing line thereto, the body having a comparatively long narrow leader passageway therethrough formed in and along a joint-face with the open side of the passageway being covered and closed by the adjacent body member, one end of the passageway opening from between body members through the outside surface of the assembled body at the normal leading end thereof, the other end of the passageway opening from between body members at the trailing end of the body and being flared to blend into the adjacent matched outer surface of the body-members, the body-surface forming said passageway being adapted to receive and circum-restrict the connective end-portion of a hookleader, and a leader retaining means associated with said protruding body portion being adapted to have the connective end of the hookleader in the passageway secured thereto with the remainder of the hookleader protruding from the flared end of the passageway.

5. A combined fishing weight and assembly member for a fishing line and a flexible hookleader, comprising a body assembled of a plurality of body-members to form a single unit, each member having a generally matching joint-face which is secured to the joint-face of the adjacent member, one of said body-members protruding from the adjacent member at the normal leading end of the body and having a line aperture through the protruding portion to secure the end of a fishing line thereto, the body having a comparatively long narrow leader passageway therethrough formed by a narrow cavity in and along a joint-face with the adjacent body member covering and closing the open side of the cavity, one end of the passageway opening from between body members through the outside surface of the assembled body at the normal leading end thereof, the other end of the passageway opening from between body members at the trailing end of the body and being flared to blend into the adjacent matched outer surface of the body-members, the body-surface forming said passageway being adapted to receive and circum-restrict the connective end-portion of a hookleader, and a leader retaining means associated with said protruding body portion being adapted to have the connective end of the hookleader in the passageway secured thereto with the remainder of the hookleader protruding from the flared end of the passageway.

6. A combined fishing weight and assembly member for a fishing line and a flexible hookleader, comprising a body assembled of a plurality of body-members to form a single unit, each member having a generally matching joint-face which is secured to the joint-face of the adjacent member, a line attaching means for the end of a fishing line being provided at the normal leading end of the assembled body, the body having a comparatively long narrow leader passageway therethrough formed in and along a joint-face with the open side of the passageway being covered and closed by the adjacent body member, one end of the passageway opening from between body members through the outside surface of the assembled body at the normal leading end thereof, the other end of the passageway opening from between body members at the trailing end of the body and being flared to blend into the adjacent matched outer surface of the body-members, the body-surface forming said passageway being adapted to receive and circum-restrict the connective end-portion of a hookleader, and a leader retaining means provided at the leading end of the body being adapted to have the connective end of the hookleader in the passageway secured thereto with the remainder of the hookleader protruding from the flared end of the passageway.

7. A combined fishing weight and assembly member for a fishing line and a flexible hookleader, comprising a body assembled of a plurality of body-members to form a single unit, each member having a generally matching joint-face which is secured to the joint-face of the adjacent member, a line attaching means for the end of a fishing line being provided at the normal leading end of the assembled body, the body having a comparatively long narrow leader passageway therethrough formed by a narrow cavity in and along a joint-face with the adjacent body member covering and closing the open side of the cavity, one end of the passageway opening from between body members through the outside surface of the assembled body at the normal leading end thereof, the other end of the passageway opening from between body members at the trailing end of the body and being flared to blend into the adjacent matched outer surface of the body-members, the body-surface forming said passageway being adapted to receive and circum-restrict the connective end-portion of a hookleader, and a leader retaining means provided at the leading end of the body being adapted to have the connective end of the hookleader in the passageway secured thereto with the remainder of the hookleader protruding from the flared end of the passageway.

8. A combined fishing weight and assembly member for a fishing line and a flexible hookleader, comprising a body assembled of a plurality of body-members each having a joint-face which generally matches the joint-face of the adjacent body member, said joint-faces and members being secured to one another to form a single unit, one of said body members protruding from the adjacent member at the normal leading end of the fishing weight and having a line aperture formed through the protruding portion to secure the end of a fishing line thereto, said body having a passageway-groove formed in and along a joint-face with the open side of the passageway-groove being covered and closed by the adjacent body member, one end of said passageway opening from between body members through the outside surface of the body near said protruding body portion, the other end of the passageway opening from between body members at the trailing end of the assembled body and being flared to blend into the adjacent matched outer surface of the body-members, said passageway being adapted to have the looped end of a hook-leader passed therethrough and the body-surface forming the passageway circum-restricting the inserted portion of the hookleader, and a leader retaining means associated with said protruding body portion being adapted to have the looped end of the hookleader in the passageway secured thereto with the remainder of the hookleader protruding from the flared end of the passageway.

9. A combined fishing weight and assembly member for a fishing line and a flexible hookleader, comprising a body assembled of a plurality of body-members each having a joint-face which generally matches the joint-face of the adjacent body-member, said joint-faces and members being secured to one another to form a single unit, a line attaching means for the end of a fishing line being provided at the normal leading end of the assembled body, the latter having a passageway-groove formed in and along a joint-face with the open side of the passageway-groove being covered and closed by the adjacent body member, one end of said passageway opening from between body members through the outside surface of the body near said line attaching means, the other end of the passageway opening from between body members at the trailing end of the assembled body and being flared to blend into the adjacent matched outer surface of the body members, said passageway being adapted to have the looped end of a hookleader passed therethrough and the body-surface forming the passageway circum-restricting the inserted portion of the hookleader, and a leader retaining means associated with the leading end of the body and passageway being adapted to have the looped end of the hookleader in the passageway secured thereto with the remainder of the hookleader protruding from the flared end of the passageway.

References Cited in the file of this patent

UNITED STATES PATENTS

| | | |
|---|---|---|
| 1,243,768 | Scott | Oct. 23, 1917 |
| 1,497,019 | Hennings | June 10, 1924 |
| 1,611,644 | Johnson | Dec. 21, 1926 |
| 2,140,724 | Stefan | Dec. 20, 1938 |